Oct. 30, 1934. A. L. STOWELL 1,978,887
FOLDING EXTENSION RULE
Filed Dec. 22, 1930
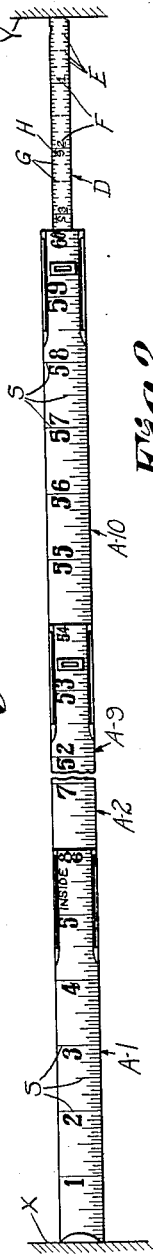
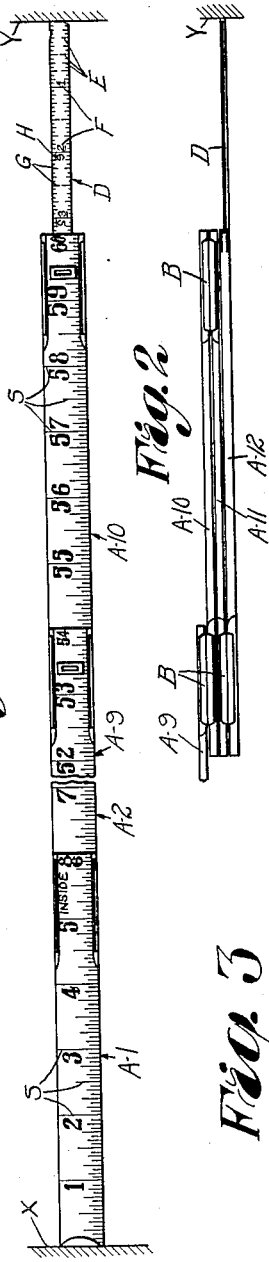
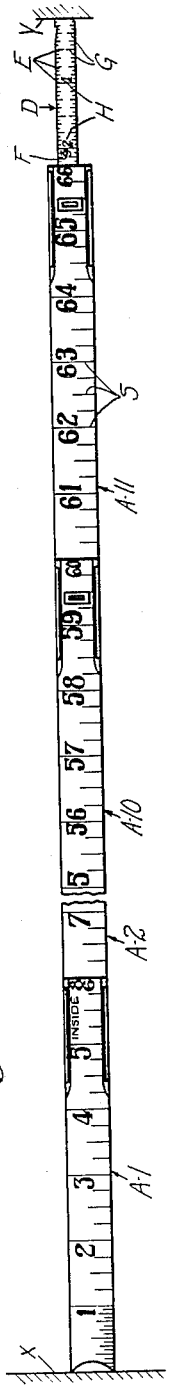
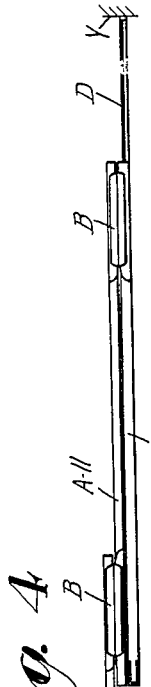
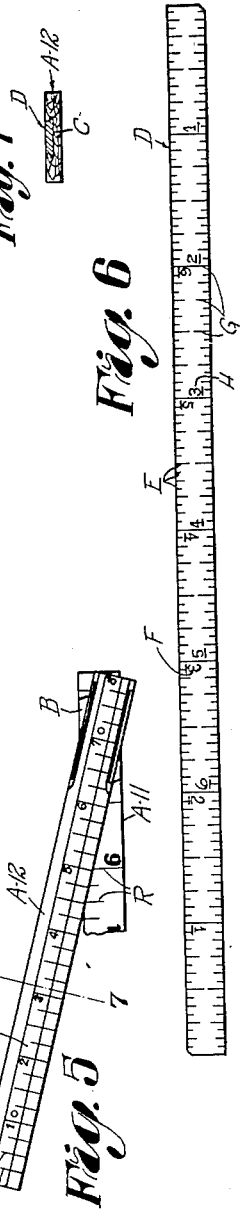
Inventor
Austin L. Stowell
By T. Clay Lindsey
Attorney Patented Oct. 30, 1934

1,978,887

UNITED STATES PATENT OFFICE 1,978,887

FOLDING EXTENSION RULE

Austin L. Stowell, New Britain, Conn., assignor to The Stanley Works, New Britain, Conn., a corporation of Connecticut Application December 22, 1930, Serial No. 504,025

2 Claims. (Cl. 33—106)

This invention relates, generally, to measuring devices and has particular reference to a folding rule composed of a plurality of sections, pivotally connected end to end, and having an extension slide.

It has been the practice to provide folding extension rules with a member slidably mounted in one face of an end section of the rule, and to provide the extension slide with a scale on that face which is normally exposed. These extension rules, as heretofore made and sold, are objectionable in that some inconvenience and difficulty is experienced in taking inside measurements, particularly where such measurements require that the rule be opened out to considerable length. In this case, it is necessary for the user to unfold the rule (starting with that end which carries the extension slide) to approximately the distance to be measured; then, at some inconvenience, taking a reading of the last figure appearing on the last opened section, and add to that figure the amount which the extension rule projects beyond the first section. While taking these readings, the user must properly hold the rule between the points to be measured, and must look first at one end of the rule and then at the other end of the rule. He must then make some mental calculations in coming to the sum of the readings with a chance he will make some mistakes in addition because of the time and trouble required in taking the readings. Some users, who are not particularly well educated or apt at figures, find it necessary to set their figures down in pencil and add them up.

The aim of the present invention is to provide an improved folding extension rule in which the above and other objections to such rules, as heretofore made and sold, are eliminated.

More particularly, the aim of the invention is to provide a folding extension rule with certain improvements which make the rule more convenient and handy in use, particularly in that a direct reading of the rule may be had when measuring inside dimensions. With the improved arrangement of the present invention, outside readings may be taken from either end of the rule and inside readings from either end of the rule, the same as with rules of this nature as previously manufactured and, additionally, direct inside readings may be had.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawing, wherein is shown, for illustrative purposes, one embodiment which the present invention may take:

Figure 1 is an elevational view of my improved rule showing the manner in which it is used for taking an inside reading with the extension slide projecting beyond the free or tipped end of the section carrying the slide;

Fig. 2 is an edge view of what is shown in Fig. 1;

Fig. 3 is a view similar to Fig. 1 but showing the rule opened up one more section so that the extension slide projects beyond the pivoted end of the section which carries that slide;

Fig. 4 is an edge view of what is shown in Fig. 3;

Fig. 5 is a front face view of the extension slide and the section carrying the same together with a portion of the next section;

Fig. 6 is a view looking at the rear face of the extension slide; and

Fig. 7 is a sectional view taken on line 7—7 of Fig. 5.

Referring to the drawing in detail, the characters A—1, A—2, up to A—12, designate the various sections of the rule which are pivoted together end to end in any suitable or approved manner, the joints between the rules being designated generally by the letter B. The rule may, of course, be of any suitable length; for example, it may be made of twelve sections, each of an effective length of six inches, making a total of seventy-two inches in all. The last section A—12 is provided on its forward face with a longitudinal groove C in which is slidably mounted, for projection beyond each end of the section A—12, an extension slide D. Each of the opposite faces of the folding rule bears a suitable scale, preferably a scale of standard or accepted units, such as feet and inches. The graduations on one side are consecutively numbered from one end of the rule, and those on the other side from the opposite end of the rule, as is the usual custom. The graduations R on the front face of the rule, that is that face in which the extension slide is mounted, are consecutively numbered starting with the free end of the last section A—12, as shown in Fig. 5, and the graduations S on the rear face of the rule are consecutively numbered starting with the free end of the first section A—1, as shown in Figs. 1 and 3. The terms "front face" and "rear face" are adapted solely for convenience in describing the invention. The front or normally exposed face of the extension slide is, as shown most clearly in Fig. 5, graduated correspondingly to the main graduations on the rule, and these graduations T are numbered consecutively starting from that end of the slide which corresponds to the free end of the section A—12.

In accordance with the present invention, the rear face of the slide, that is that face which is opposed to the bottom of the groove C, is also graduated in accordance with the scale used on the faces of the main rule, and these graduations are consecutively numbered in both directions, as shown in Figs. 1, 3 and 6. To express the arrangement in a different way, it may be said that each edge of the rear face of the slide has a set of graduations, and one set is numbered starting from one end of the slide and the other set is numbered starting from the other end of the slide. The graduations at one side edge are designated by the letter E, and the numerals associated therewith by the letter F; while the graduations at the other side edge are designated by the letter G and the numerals by the letter H.

In using the rule, outside readings may be taken from either end thereof and inside readings from either end with the slide uppermost, as has been done in the past. When it is desired to take an inside reading of considerable length, the rule is opened, starting with the end A—1 opposite the one having the extension slide, and when the rule has been opened to the approximate distance of the space to be measured, the user places his finger under the extension slide and draws it out until it touches the abutment or point to be gauged. This is shown in Fig. 1 where it is assumed that the distance between the gauging points or abutments X and Y are to be measured. The first ten sections of the rule have been opened up, the section A—1 has been engaged with the abutment X, and the finger of the operator has projected the slide beyond the free end of the section A—12 in order to engage the end of the slide against the abutment Y. The user, by looking at the right hand end only of the rule, can easily determine the distance between the abutments X and Y, it being only necessary to add to the last figure appearing on the rule, namely to the figure sixty, the figure or graduation E which appears on the extension slide where that slide emerges from the end section which, in the present instance, is three and one-quarter inches. These readings may be very quickly taken and added together as both of them are immediately before the eyes of the user, so that accuracy is assured with a minimum amount of effort and inconvenience. Where the distance between the points to be gauged is such as to require the rule to be opened to a position where the hinged end of the last section A—12 is directed towards one of the abutments, as shown in Figs. 3 and 4, the extension slide is projected from that end of the end section A—12 and, in this event, the other scale G and group of numbers H are employed for determining the extent to which the slide projects. In Figs. 3 and 4, the distance between the abutments is sixty-six inches (indicated by the last number on the rear face of the folding rule) plus two and one-quarter inches (indicated by the scale G on the extension slide) making a total of sixty-eight and one-quarter inches.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a folding extension rule of the character described, a rule comprising a plurality of sections pivoted end to end and having scales on its opposite faces, the graduations of one scale being consecutively numbered from one end of the rule and those of the other scale from the opposite end of the rule, and an extension slide mounted in a front face of one of the end sections and adapted to be projected beyond each end thereof, said extension slide bearing on its forward face a scale and having on its rear face two scales of like denomination, one of said last-mentioned scales starting at one end of the slide and the other at the opposite end of the slide.

2. In a folding extension rule of the character described, a rule comprising a plurality of sections pivoted end to end and having on its front face a scale with graduations consecutively numbered starting at one end of the rule and a like scale on its rear face with graduations consecutively numbered starting at the other end of the rule, and an extension slide slidably mounted in that face of one of the end sections which bears the beginning end of the first-mentioned scale, said extension slide being adapted selectively to be projected beyond each end of said section and bearing on its front face a scale of the same unit and numbered correspondingly to the scale on said front face of the rule, said extension slide having on its rear face two scales corresponding to the scale on the rear face of the rule and starting from opposite ends of the slide, the scales on the rear face of said slide having graduations consecutively and respectively numbered from opposite ends of the slide.

AUSTIN L. STOWELL.